US011256514B1

(12) United States Patent
Neumann

(10) Patent No.: US 11,256,514 B1
(45) Date of Patent: Feb. 22, 2022

(54) METHOD OF SYSTEM FOR GENERATING A CLUSTER INSTRUCTION SET

(71) Applicant: KPN INNOVATIONS, LLC., Lakewood, CO (US)

(72) Inventor: Kenneth Neumann, Lakewood, CO (US)

(73) Assignee: KPN INNOVATIONS, LLC., Lakewood, CO (US)

( * ) Notice: Subject to any disclaimer, the term of this patent is extended or adjusted under 35 U.S.C. 154(b) by 0 days.

(21) Appl. No.: 17/032,104

(22) Filed: Sep. 25, 2020

(51) Int. Cl.
*G06F 16/00* (2019.01)
*G06F 9/38* (2018.01)
*G06N 20/00* (2019.01)

(52) U.S. Cl.
CPC ........... *G06F 9/3853* (2013.01); *G06N 20/00* (2019.01)

(58) Field of Classification Search
CPC .............................. G06F 9/3853; G06N 20/00
See application file for complete search history.

(56) References Cited

U.S. PATENT DOCUMENTS

| 8,200,548 | B2 | 6/2012 | Wiedl | |
| 10,026,055 | B2 | 7/2018 | Riel-Dalpe et al. | |
| 10,168,171 | B2 * | 1/2019 | van Dok | G01C 21/3605 |
| 10,458,808 | B2 * | 10/2019 | Droege | G01C 21/3679 |
| 10,671,086 | B2 * | 6/2020 | Yao | G01C 21/3492 |
| 10,740,715 | B1 * | 8/2020 | Kumar | G06Q 10/083 |
| 10,885,479 | B1 * | 1/2021 | Reiss | G06Q 10/063114 |
| 10,915,853 | B2 * | 2/2021 | Berk | G06N 20/00 |
| 10,977,751 | B1 * | 4/2021 | Bernstein | G06Q 50/12 |
| 2002/0004749 | A1 | 1/2002 | Froseth et al. | |
| 2004/0210621 | A1 | 10/2004 | Antonellis | |
| 2005/0015281 | A1 * | 1/2005 | Clark | G16H 10/60 705/2 |
| 2010/0280895 | A1 | 11/2010 | Mottola | |
| 2014/0058794 | A1 | 2/2014 | Malov et al. | |
| 2015/0227888 | A1 | 8/2015 | Levanon et al. | |
| 2016/0372005 | A1 | 12/2016 | Bajpai et al. | |
| 2017/0024789 | A1 | 1/2017 | Frehn et al. | |
| 2017/0372197 | A1 | 12/2017 | Baughman et al. | |

(Continued)

OTHER PUBLICATIONS https://www.sciencedirect.com/science/article/pii/S0959652620306740.
https://www.semanticscholar.org/paper/The-Meal-Delivery-Routing-Problem-Reyes-Erera/1c0b0f117437f4123cdeb77c24210610733de706.

*Primary Examiner* — Cheng Yuan Tseng
(74) *Attorney, Agent, or Firm* — Caldwell Intellectual Property Law, LLC

(57) ABSTRACT

A system for generating a cluster combination instruction set using machine learning, the system comprising a computing device configured to generate, as a function of a received cluster, a plurality of physical transfer paths from a distinct plurality of initiation points to a single locale, wherein the cluster comprises a cluster of a plurality of alimentary elements, determine, as a function of the plurality of physical transfer paths, a physical transfer pattern, generate an objective function of the plurality of physical transfer paths as a function of a plurality of constraints, select a physical transfer path that minimizes objective function, determine a cluster combination instruction set for the physical transfer pattern to the single destination, and generate a representation of the cluster combination instruction set via a graphical user interface to at least a physical transfer apparatus and the plurality of alimentary element originators.

20 Claims, 7 Drawing Sheets

(56) References Cited

U.S. PATENT DOCUMENTS

| | | | |
|---|---|---|---|
| 2018/0293638 A1 | 10/2018 | Simpson | |
| 2018/0308066 A1 | 10/2018 | Hadatsuki | |
| 2019/0043143 A1 | 2/2019 | Camacho et al. | |
| 2020/0065892 A1 | 2/2020 | Brown | |
| 2020/0410391 A1* | 12/2020 | Barrett | G06F 21/41 |
| 2021/0019694 A1* | 1/2021 | Dhesi | G06Q 10/087 |

* cited by examiner

METHOD OF SYSTEM FOR GENERATING A CLUSTER INSTRUCTION SET

FIELD OF THE INVENTION

The present invention generally relates to the field of machine-learning. In particular, the present invention is directed to methods and systems for generating a cluster instruction set.

BACKGROUND

Efficient path selection using path guidance is an increasingly vital process for provisioning of alimentary elements. However, existing methods for path selection using path guidance suffer from inaccuracy in providing a unifying system for a plurality of users at a single locale placing orders from a plurality of alimentary element originators.

SUMMARY OF THE DISCLOSURE

In an aspect, A system for generating a cluster combination instruction set using machine learning, the system comprising a computing device configured to generate, as a function of a received cluster, a plurality of physical transfer paths from a distinct plurality of initiation points to a single locale, wherein the cluster comprises a cluster of a plurality of alimentary elements, determine, as a function of the plurality of physical transfer paths, a physical transfer pattern, generate an objective function of the plurality of physical transfer paths as a function of a plurality of constraints, select a physical transfer path that minimizes objective function, determine a cluster combination instruction set for the physical transfer pattern to the single destination, and generate a representation of the cluster combination instruction set via a graphical user interface to at least a physical transfer apparatus and the plurality of alimentary element originators.

In another aspect, a method for generating a cluster combination instruction set using machine learning, the method comprising a computing device configured for generating, as a function of a received cluster, a plurality of physical transfer paths from a distinct plurality of initiation points to a single locale, wherein the cluster comprises a cluster of a plurality of alimentary elements, determining, as a function of the plurality of physical transfer paths, a physical transfer pattern, generate an objective function of the plurality of physical transfer paths as a function of a plurality of constraints, selecting a physical transfer path that minimizes objective function, determine a cluster combination instruction set for the physical transfer pattern to the single destination, and generating a representation of the cluster combination instruction set via a graphical user interface to at least a physical transfer apparatus and the plurality of alimentary element originators.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for generating a cluster instruction set. In an embodiment, a computing device is configured to receive a cluster of a plurality of alimentary elements from at least a user destined for a single locale. Computing device may be configured to notify a plurality of users at the single locale, via a graphical user interface, to submit additional alimentary elements to the cluster according to each user's unique alimentary element program. Computing device may utilize a machine-learning process and an objective function, to generate a plurality of physical transfer paths as a function of a plurality of constraints involved in the physical transfer process. Computing device may rank the plurality of physical transfer paths using a ranking machine-learning process which using a ranking function for each physical transfer path as a function of the physical transfer resources and time required. Computing device may determine a physical transfer pattern by selecting a physical transfer path as a function of the ranking and generating a cluster instruction set. Cluster instruction set may contain alimentary element originator-specific and physical transfer apparatus-specific instructions. Computing device is configured to generate a representation of the cluster instruction set via a graphical user interface to at least a physical transfer apparatus and the plurality of alimentary element originators.

Figure 1:
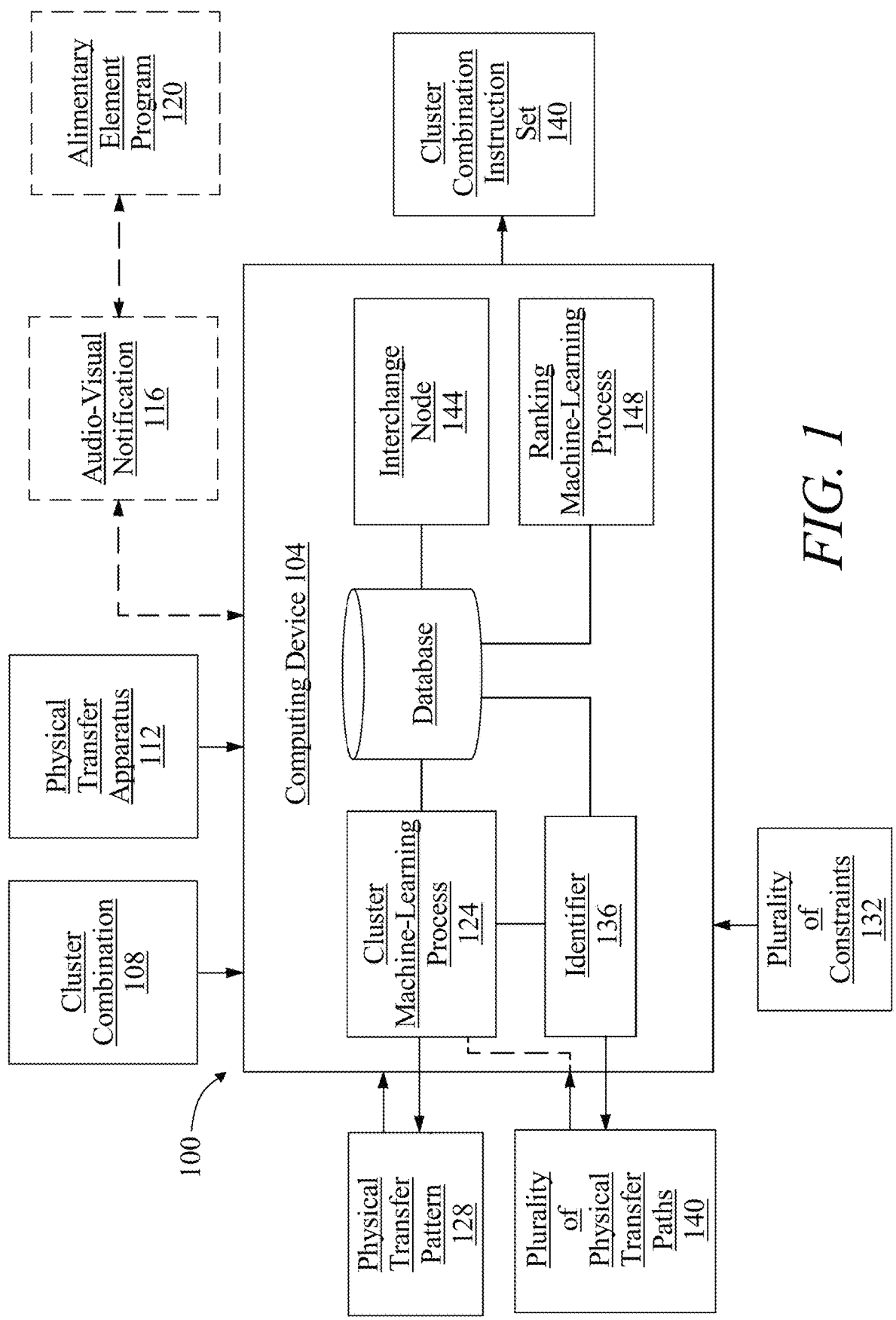
FIG. 1 is a block diagram of an exemplary embodiment of a system of generating a cluster instruction set.

Referring now to FIG. 1, an exemplary embodiment of a system 100 for generating a cluster instruction set is illustrated. System includes a computing device 104. Computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

Continuing in reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing in reference to FIG. 1, computing device 104 is configured to receive a cluster of a plurality of alimentary elements for physical transfer to a single locale. An "alimentary element," as used in this disclosure, is a meal, grocery item, food element, nutrition supplement, edible arrangement, or the like, that may be generated by a restaurant, cafeteria, fast food chain, grocery store, food truck, farmer's market, proprietor, convenience store, deli, or any place that would have a need for providing an alimentary item to a customer, client, patient, or individual. A "cluster," as used in this disclosure, is a plurality of alimentary elements, associated with a plurality of orders, destined for a single locale at the same time. A cluster 108 may be a series of distinct alimentary elements for a plurality of users and/or a single user destined to a singular place. A cluster 108 may contain alimentary elements that originate from a plurality of establishments, for instance and without limitation, restaurants, grocery stores, food trucks, fast food chains, convenience stores, and the like, including a plurality of each and/or any combination thereof. In non-limiting illustrative examples, a cluster 108 may be a burger from a fast food chain, a fruit tray from a grocery store, candied yams from a gas station, an entrée from a restaurant, and a protein drink from a health food store, wherein the alimentary elements are destined to a single office building for a plurality of individuals. In further non-limiting illustrative examples, a cluster 108 may include an order of boneless chicken wings from a restaurant, a case of drinks from a grocery store, and a pizza from a fast food chain ordered by a single user and destined for a single residence.

Continuing in reference to FIG. 1, a "physical transfer apparatus," as used in this disclosure is any apparatus suitable for use as computing device 104, and that is associated with, incorporated in, and/or operated by user, a vehicle, bike, drone, robot, autonomous vehicle, car, truck, etc. that is physically exchanging an alimentary element from the originator to the user. A physical transfer apparatus 112 may a vehicle operated by an individual to receive and physically transfer alimentary elements. A physical transfer apparatus 112 may be an electric-powered drone or robot that is equipped to pick up alimentary element packages for physical transfer.

Continuing in reference to FIG. 1, receiving a cluster 108 of a plurality of alimentary elements for physical transfer to a single locale may include generating an audiovisual notification in response to receiving the cluster 108. An "audiovisual notification," as used in this disclosure is a graphical, textual, and/or sound-based notification displayed to a user via a graphical user device, "smartphone", heads-up display, laptop, tablet, internet-of-things (IOT) device, or the like. Audiovisual notification 116 may be displayed via a graphical user interface, wherein the audiovisual notification 116 may include information about submitting to the cluster 108 as a function of an alimentary element program. An audiovisual notification 116 may include an alert that notifies a user that others at their location corresponding to building a cluster 108 of alimentary elements. A user may receive an audiovisual notification 116 that notifies the user on the status of at least an alimentary element that is part of a cluster 108, wherein the status is information regarding the alimentary element location, physical transfer apparatus, the status of the physical transfer, and the like.

Continuing in reference to FIG. 1, an "alimentary element program," as used in this disclosure, is a plurality of alimentary elements that a user may be informed to select based on a user's biological extraction data. An alimentary element program 120 may include, for instance and without limitation, an instruction set that a computing device 104 may provide to a user, via a graphical user interface, concerning alimentary elements that may improve user's biological extraction parameters. An alimentary element program 120 may include alimentary elements a user is expected to substitute to avoid ailments such as allergy, food intolerances, inflammation, and the like. An alimentary element program 120 may include alimentary elements a user is expected to include in their diet to address nutrition deficiencies, symptoms, diseases, and the like. In non-limiting illustrative examples, an alimentary element program 120 may be associated with an audiovisual notification, wherein the notification contains an alimentary element obtained from the alimentary element program 120. An alimentary element program 120 may be an alimentary element instruction set, as described above, and/or as described in U.S. Nonprovisional application Ser. No. 16/375,303, filed on Apr. 4, 2019, and entitled "SYSTEM AND METHODS FOR GENERATING ALIMENTARY INSTRUCTION SETS BASED ON VIBRANT CONSTUTIONAL GUIDANCE," the entirety of which is incorporated herein by reference.

Continuing in reference to FIG. 1, "biological extraction data," as used in this disclosure is any biological, chemical, physiological, etc. data that is associated with and/or generated by the user. Biological extraction data may include medical histories, diseases, surgeries, injuries, symptoms, exercise frequency, sleep patterns, lifestyle habits, and the like, that may be used to inform a user's diet. Biological extraction data may include diet information such as nutrition deficiencies, food intolerances, allergies, and the like. Biological extraction data may alternatively or additionally include any data used as a biological extraction as described in U.S. Nonprovisional application Ser. No. 16/502,835, filed on Jul. 3, 2019, and entitled "METHODS AND SYSTEMS FOR ACHIEVING VIBRANT CONSTITUTION BASED ON USER INPUTS," the entirety of which is incorporated herein by reference.

Continuing in reference to FIG. 1, the audiovisual notification 116 may address a user to submit an alimentary element to the cluster 108, wherein the alimentary element corresponds to an alimentary element program 120. Audiovisual notification 116 may be transmitted via a graphical user interface to each user of the plurality of users about submitting suitable alimentary elements to the cluster combination, wherein the alimentary elements correspond with their respective alimentary element programs 120. A "suitable alimentary element," as used in this disclosure, is an alimentary element that a user may select as a function of an alimentary element program 120. A user may receive an audiovisual notification 116 concerning a cluster 108 at their location, wherein the cluster 108 may be a queue that a plurality of users that have been notified to for submitting an alimentary element. A user may receive an audiovisual notification 116, wherein the notification directs the user to at least a suitable alimentary element to add to the cluster 108. Computing device 104 may be configured to send the notification and retrieve, for instance from a database, at least a suitable alimentary element for a user.

Continuing in reference to FIG. 1, computing device 104 is configured to determine, as a function of the plurality of physical transfer paths, a physical transfer pattern. Cluster machine-learning process 124 may be any machine-learning algorithm performed by a machine-learning module, as described in further detail below. A "physical transfer pattern," as used in this disclosure, is a determined physical transfer path for at least a physical transfer apparatus to follow for obtaining all alimentary elements from all alimentary element originators for physical transfer to a single final location, including the number of physical transfer apparatuses, the order in which the alimentary elements are to be obtained, and the transfer paths that all items are intended to follow over a defined time, the location and time of any interchange nodes, and the times at which the alimentary element originators are to generate each alimentary element. A "physical transfer path," as used in this disclosure, is a path that a physical transfer apparatus 112 may follow. A physical transfer path may be simply referred to, for the purposes of this disclosure, as a "transfer path." An "alimentary element originator," as used in this disclosure, is an entity that may prepare and/or generate an alimentary element for pickup by a physical transfer apparatus 112, as indicated here, such as a restaurant, fast food chain, grocery store, food truck, and the like. An alimentary element originator may be simply referred to for the purposes of this disclosure as an "originator". An alimentary element originator may include a stationary originator and/or an originator with a specific location. An alimentary element originator may include an individual and/or a business.

Continuing in reference to FIG. 1, a physical transfer path may differ in nature depending on the type of physical transfer apparatus 112 indicated; for instance and without limitation a physical transfer path for a drone may include straight-line paths across a city, whereas a transfer path for a vehicle may abide by a city's street grid and transportation infrastructure. A physical transfer pattern 128 may include a single physical transfer path for a single physical transfer apparatus and/or a plurality of physical transfer apparatuses 112. A physical transfer pattern 128 may include a plurality of physical transfer paths for a single physical transfer apparatus 112 and/or a plurality of physical transfer apparatuses 112. Cluster machine-learning process 124 may accept an input that is a cluster 108, wherein the cluster 108 contains a plurality of alimentary elements and a plurality of alimentary element originators and a single final physical transfer location, and generate an output which is a physical transfer pattern 128. Cluster machine-learning process 124 may generate a plurality of physical transfer patterns 128, wherein the physical transfer patterns 128 may differ in the number of resources used, for instance and without limitation, the number of physical transfer apparatuses 112 used, the lengths of and/or number of the transfer paths, the order in which alimentary elements are picked-up and/or generated, and the like.

Continuing in reference to FIG. 1, determining the physical transfer pattern 128 includes generating a plurality of physical transfer paths using a cluster machine-learning process 124, wherein the cluster machine-learning process generates at least a physical transfer path for each alimentary element of the cluster. Using the cluster machine-learning process 124 to generate a plurality of physical transfer paths to the single locale may include generating the physical transfer paths given a plurality of constraints. A "plurality of constraints," as used in this disclosure, is a plurality of resource constraints, both physical and non-physical, that a machine-learning process uses to determine a physical transfer pattern 128 and to optimize a physical transfer path. A plurality of constraints 132 may include physical resource constraints such as the number of physical transfer apparatuses 112, the availability of physical transfer apparatuses 112, geophysical data regarding each physical transfer apparatus 112, the status of each alimentary element at each originator, etc. A plurality of constraints 132 may include non-physical resources constraints such as times, for instance and without limitation, the time elapsed since a cluster 108 is placed to a plurality of originators, expected times of arrival of physical transfer apparatuses 112, and/or times required for each physical transfer apparatus 112 to obtain each alimentary element to its associated location. Physical transfer patterns 128 may differ in the navigation of the plurality of constraints, for instance and without limitation, making use of a single physical transfer apparatus 112 versus a plurality of physical transfer apparatuses 112, wherein subsequent physical transfer patterns 128 will have fewer available physical transfer apparatuses 112. In non-limiting illustrative examples, a plurality of physical transfer patterns 128 may differ in the amount of time required to complete physical transfer, wherein a first physical transfer pattern 128 may have an alimentary element order that minimizes standby time and a second physical transfer pattern 128 minimizes driving distances. In further non-limiting illustrative examples, a plurality of physical transfer patterns 128 may differ in which physical transfer apparatuses 112 are selected and assigned to which transfer paths, for instance physical transfer apparatuses 112 whose geophysical locations indicate closer starting proximity versus those which are more distant.

Continuing in reference to FIG. 1, the plurality of constraints 132 may include geophysical data regarding each physical transfer apparatus. "Geophysical data," as used in this disclosure is an address, longitude and/or latitude position, global position system (GPS) coordinates, or the like, that system 100 may use to identify the physical location of a physical transfer apparatus, alimentary element, alimentary element originator, user, and the like. Geophysical data regarding each physical transfer apparatus may include a "status" of each physical transfer apparatus, wherein the status may include an indication that a physical transfer apparatus is nearby an alimentary element and/or suitable to retrieve alimentary element.

Continuing in reference to FIG. 1, using a cluster machine-learning process 124 to determine a physical transfer pattern 128 may include generating an identifier for each alimentary element of a cluster 108 of a plurality of alimentary elements. An "identifier," as used in this disclosure, is a qualitative and/or quantitative signifier for an alimentary element that includes a package of data relevant to a machine-learning process for tracking the identity of the alimentary element and the associated data that places the alimentary element within the context of all other alimentary elements of the cluster combination. Identifier 136 may include data regarding submission timestamp, user identity, and a designation of an alimentary element originator. In non-limiting exemplary embodiments, an identifier 136 may include the identity of the alimentary element; the identity of the associated user; the identity and location of the associated alimentary element originator; the timestamp at which the order was submitted to a cluster 108; the timestamp of when the alimentary element should be prepared and/or generated by the alimentary element originator; the timestamp of when a physical transfer apparatus should pick-up an alimentary element from the originator; the timestamp of when an alimentary element is expected to arrive to a user; the position of an alimentary element in a cluster 108, for instance alimentary element 1 of 11 in the cluster 108; the position of an alimentary element in a cluster 108 of a particular alimentary element originator, for instance alimentary element 1 of 3 from alimentary element originator #1. In non-limiting illustrative examples, cluster machine-learning process 124 may accept all the above pieces of data as inputs and generate an identifier 136 which includes data attached to each alimentary element in a physical transfer pattern 128. In further non-limiting illustrative examples, some data in an identifier 136, such as expected timestamps, may change between physical transfer patterns 128, depending on the plurality of constraints 132 and/or when a alimentary element is expected to be prepared by an originator, received by a physical transfer apparatus 112, and the like.

Continuing in reference to FIG. 1, using a cluster machine-learning process 124 to determine a physical transfer pattern 128 may include determining, using the identifier 136 and the objective function, when each alimentary element originator should generate each alimentary element as a function of the plurality of constraints and the plurality of physical transfer paths. In non-limiting exemplary embodiments, computing device 104 may compute a score associated with each physical transfer pattern 128 and select alimentary element order of pick-up and/or order of preparation, physical transfer apparatus 112, number of physical transfer apparatuses 112, and the like, to minimize and/or maximize the score, depending on whether an optimal result is represented, respectively, by a minimal and/or maximal score; a mathematical function, described herein as an "objective function," may be used by computing device 104 to score each possible pairing. Objective function may be based on one or more objectives, as described below. Computing device 104 may pair a predicted transfer path 128, with a given physical transfer apparatus 112, that optimizes the objective function. In various embodiments, a score of a particular physical transfer pattern 128 may be based on a combination of one or more factors, including a plurality of constraints 132. Each factor may be assigned a score based on predetermined variables. In some embodiments, the assigned scores may be weighted or unweighted.

Continuing in reference to FIG. 1, computing device 104 configured to determining the physical transfer pattern includes generating an objective function of the plurality of physical transfer paths as a function of a plurality of constraints, wherein minimizing the objective function minimizes the plurality of physical transfer resources. As used in this disclosure, "minimizing" signifies minimizing a difference from a goal representing a best solution, where the goal could be a maximal output, minimal output, or target number/set of numbers. Minimizing and/or optimizing an objective function may include minimizing the quantity of physical resources used, minimizing time for physical transfer, and the like. Alternatively or additionally, minimizing physical resources used may refer to optimizing an objective function to achieve a maximal score, such as a maximal score in pairing an interchange node time and location to a plurality of transfer paths. Minimizing physical resources may refer to optimizing an objective function to achieve a specific range of values, or the like, wherein the optimal solution is not a minimal value.

With continued reference to FIG. 1, minimization of objective function may include performing a greedy algorithm process. A "greedy algorithm" is defined as an algorithm that selects locally optimal choices, which may or may not generate a globally optimal solution. For instance, computing device 104 may select physical transfer apparatus so that scores associated therewith are the best score for each alimentary element transfer path and/or for each physical transfer apparatus 112 and/or plurality of physical transfer apparatuses 112. In such an example, optimization of a greedy algorithm may determine the combination of transfer paths such that each delivery of each pairing includes the highest score possible but may not represent a globally optimal solution for the entire cluster combination.

Still referring to FIG. 1, objective function may be formulated as a linear objective function, which computing device 104 may solve using a linear program such as without limitation a mixed-integer program. A "linear program," as used in this disclosure, is a program that optimizes a linear objective function, given at least a constraint. For instance, the availability of physical transfer apparatuses, the geophysical location of physical transfer apparatuses, the order with which physical transfer apparatuses should pick-up alimentary elements, when an alimentary element originator should generate an alimentary element, among other constraints. In various embodiments, system 100 may determine a physical transfer pattern 128 that maximizes a total score subject to a constraint, as described above. A mathematical solver may be implemented to solve for the set of physical transfer patterns 128 that maximizes scores; mathematical solver may implement on computing device 104 and/or another device in system 100, and/or may be implemented on third-party solver.

With continued reference to FIG. 1, optimizing objective function may include minimizing a loss function, where a "loss function" is an expression an output of which an optimization algorithm minimizes to generate an optimal result. As a non-limiting example, computing device 104 may assign variables relating to a set of parameters, which may correspond to score components as described above, calculate an output of mathematical expression using the variables, and selects a physical transfer pattern 128 that produces an output having the lowest size, according to a given definition of "size," of the set of outputs representing each of plurality of candidate ingredient combinations; size may, for instance, included absolute value, numerical size, or the like. Selection of different loss functions may result in identification of different potential pairings as generating minimal outputs.

Continuing in reference to FIG. 1, objective function, as used in this disclosure, may refer to a program that optimizes a linear objective function, given at least a constraint. For instance, and without limitation, objective function may seek to maximize a total score $\Sigma_{r \in R} \Sigma_{s \in S} c_{rs} x_{rs}$, where R is the set of all physical transfers patterns r, S is a set of all alimentary elements of a cluster 108 $s$, $c_{rs}$ is a score of a pairing of a given transfer path with a given combination of alimentary elements, and $x_{rs}$ is 1 if a route r is paired with physical transfer apparatus 112 $s$, and 0 otherwise. Continuing the example, constraints may specify that each alimentary element is assigned to only one physical transfer apparatus 112, and each batch is assigned only one physical transfer apparatus 112. Physical transfer patterns 128 may be optimized for a maximum score combination of all generated combinations, with selection based on a value indicating an optimized combination. In various embodiments, system 100 may determine combination of alimentary element transfer paths, originator times, and physical transfer apparatus 112 assignment, and the like, that maximizes a total score subject to a plurality of constraint that all deliveries are paired to exactly one physical transfer apparatus 112. Not all physical transfer apparatuses 112 may receive a physical transfer pattern 128 pairing since each delivery may only be delivered by one physical transfer apparatus 12; likewise, a physical transfer pattern may receive a more optimal scoring by assigning more physical transfer apparatuses 112. A mathematical solver may be implemented to solve for the set of feasible paths that maximizes the sum of scores across all pairings; mathematical solver may implemented on computing device 104 and/or another device in system 100, and/or may be implemented on third-party solver.

Continuing in reference to FIG. 1, objective function may be implemented as described above, and/or as described in U.S. Nonprovisional application Ser. No. 16/890,839, filed on Jun. 2, 2020, and entitled "METHODS AND SYSTEMS FOR PATH SELECTION USING VEHICLE ROUTE GUIDANCE," the entirety of which is incorporated herein by reference. A machine-learning process, such as a cluster machine-learning process 124 may call such an algorithm and perform it for one or more steps in generating a physical transfer pattern 128 and/or optimizing the physical transfer pattern 128, given a plurality of constraints 132. Persons skilled in the art, upon review of this disclosure in its entirety, will be aware of the various methods and algorithms performed by a computing device to optimize a physical transfer patterns given a plurality of variables that represent constraints to the optimal solution.

Continuing in reference to FIG. 1, computing device 104 minimizing the objective function may include minimizing plurality of physical transfer resources further comprises minimizing the number of physical transfer apparatuses utilized while minimizing the amount of time to perform the physical transfer pattern. Cluster machine-learning process 124 may perform an objective function, as described above, to optimize a plurality of physical transfer patterns 128, wherein optimizing the plurality of physical transfer patterns 128 may include working toward an output that represents a single physical transfer pattern 128 of the plurality that minimizes the use of resources, including the number of amount of physical transfer apparatuses 112 used and/or the amount of time needed to complete each physical transfer pattern 128.

Continuing in reference to FIG. 1, using an objective function to minimize physical transfer resources may include optimizing a plurality of variables involved in determining a physical transfer pattern 128. Optimizing may include, for instance, minimizing the number of physical transfer apparatuses used while minimizing the amount of time to complete a physical transfer pattern 128. Variables may include, the number of, availability of, and geophysical location of physical transfer apparatuses 112, the order of receiving alimentary elements from originators, the time of originators generating each alimentary element, the transfer paths each physical transfer apparatus 112 follows, and the like. Computing device 104 performing cluster machine-learning process 124 may use an objective function, as described above, wherein an optimal solution results in reducing the number of physical transfer apparatuses used to complete a physical transfer pattern 128. Alternatively or additionally, cluster machine-learning process 124 may use an objective function to determine the values of variables associated with, for instance and without limitation, the times for preparing the alimentary elements, the order in which the alimentary elements are obtained, and the transfer paths taken, wherein the objective function determines when alimentary elements are to be generated in order to minimize the time required for a physical transfer apparatus 112 to follow the transfer paths in obtaining them all.

In some instances, and still referring to FIG. 1, reducing the number of physical transfer apparatuses 112 may result in a concomitant increase in the amount of time required to complete the physical transfer pattern 128. In such an instance, cluster machine-learning process 124 may recognize that such a tradeoff exists, wherein decreasing one parameter (number of physical transfer apparatuses 112)

increases a second parameter (time required for completing transfer paths). In such an example, cluster machine-learning process 124 may determine from an identifier a maximal threshold of time exists, wherein the maximal threshold of time for a cluster 108 of alimentary elements must not be exceeded for physical transfer. For instance and without limitation, upon placing the cluster 108 of a plurality of alimentary elements, a plurality of users may receive an estimated timestamp describing when to expect the alimentary elements. In such an example, this estimated timestamp may be included in the identifier associated with alimentary element, wherein the timestamp becomes a constraint that the cluster machine-learning process 124 'knows' the optimized physical transfer pattern 128 must not exceed. In such a non-limiting example, cluster machine-learning process 124 may then learn to minimize physical transfer apparatus resources, including vehicles, transfer paths, personnel, and the like, while keeping below a maximal time threshold in an identifier. If not possible with the current number of physical transfer apparatuses selected, cluster machine-learning process 124 'knows' to increase by a discrete amount, such as by 1 physical transfer apparatus, and re-calculate time requirements for completing physical transfer paths. Cluster machine-learning process 124 may iteratively perform these optimization calculations, wherein the cluster machine-learning process 124 may 'learn' for each cluster 108 the number of physical transfer apparatuses result in minimized time requirements, wherein the maximal time requirement may be used to minimize the number of physical transfer apparatuses used.

Continuing in reference to FIG. 1, cluster machine-learning process 124 may use an optimized physical transfer pattern 128, wherein the number of physical transfer apparatuses 112 and time requirements are minimized, to inform when each alimentary element originator should prepare and/or generate each alimentary element. Cluster machine-learning process 124 may identify an optimal transfer path from each alimentary element to the final location for the optimized number of physical transfer apparatuses 112, wherein the transfer path dictates the order in which each alimentary elements are picked-up, and thus when the alimentary element should be prepared and/or generated by the originator. Alternatively or additionally, cluster machine-learning process 128 may determine which a transfer path between each originator and determine the order in which originators should prepare and/or generate each alimentary element for the physical transfer apparatus to follow the optimal physical transfer pattern 128.

Continuing in reference to FIG. 1, determining a physical transfer pattern 128 may include using a cluster machine-learning process 124 to generate a plurality of candidate transfer paths 140, wherein each candidate physical transfer path 140 is a geophysical path that a physical transfer apparatus 112 may follow to obtain an alimentary element and transfer to a single locale. A "geophysical path," as used in this disclosure, is a series of addresses, longitude and/or latitude, global position system (GPS) coordinates, or the like, which trace a path throughout a physical space such as a neighborhood, city, building, or the like, along which a physical transfer apparatus may follow. Cluster machine-learning process 124 may output, as a function of optimizing a physical transfer pattern 128, a plurality of candidate transfer paths 140, wherein each output is a geophysical path that a physical transfer apparatus 112, and/or a plurality of physical transfer apparatuses may follow in concert to obtain all alimentary elements and transfer to the single locale within a specific time frame.

Continuing in reference to FIG. 1, determining a physical transfer pattern 128 may include using the cluster machine-learning process 124 to identify at least an interchange node, wherein each interchange node of the at least an interchange node comprises a node location and a node time based on the physical locations of a plurality of physical transfer apparatuses prior to physical transfer to a user location. An "interchange node," as used in this disclosure, is a centralized geophysical location that can become a distribution center for alimentary elements to be loaded, swapped, or otherwise exchanged between physical transfer apparatuses, including a time associated with when physical transfer apparatuses are to arrive at the geophysical location. For instance and without limitation, interchange nodes 144 may be parking lots, fuel stations, warehouses, storage centers, parks, convenience stores, or the like, that may accommodate physical transfer apparatuses to take on alimentary elements for physical transfer. An interchange node 144 location and time for physical transfer to meet at a node location may be generated and/or selected by computing device 104 based on candidate physical transfer path, physical transfer apparatus geophysical location, transfer timestamps, and the like, as described above by cluster machine-learning process 128 and/or as described in U.S. Nonprovisional application Ser. No. 16/983,096, filed on Aug. 3, 2020, and entitled "METHODS AND SYSTEMS FOR DETERMINING PHYSICAL TRANSFER INTERCHANGE NODES," the entirety of which is incorporated herein by reference.

Continuing in reference to FIG. 1, determining a physical transfer pattern 128 may include calculating a change in candidate physical transfer path 140 time and distance resulting from using the interchange node 144. Computing device 104 may generate interchange node locations, as described above, wherein the cluster machine-learning process 124 may accept the interchange node as an input for outputting candidate physical transfer paths 140. Cluster machine-learning process 124 may include an interchange node 144 in candidate physical transfer paths 140 and calculate, using any mathematical operation, such as subtraction, if adding the interchange node 144 resulted in minimizing the number of physical transfer apparatuses 112 and/or minimizing the time required for the physical transfer. Alternatively or additionally, computing device 104 may calculate difference between candidate physical transfer path 140 times and distances outputs, with and without an interchange node 144 included, and iteratively determine if including the interchange node minimizes physical resources. In the event that adding the interchange node 144 results in a more optimal physical transfer pattern 128, cluster machine-learning process 124 may generate more candidate transfer paths 140 with additional interchange nodes 144. The addition of interchange nodes 144 may be done until the amount of physical resources are exceeded (not enough physical transfer apparatuses available), and/or the time is no longer being minimized with adding interchange nodes 144.

Continuing in reference to FIG. 1, determining a physical transfer pattern may include which physical transfer path and interchange node 144 pairing of the plurality of candidate transfer paths 140 minimizes the objective function. Computing device 104 may select the physical transfer path of the plurality of candidate physical transfer paths 140 and interchange node 144 pairing that results in minimizing the physical resources used, as described above. Computing device 104 may determine a physical transfer pattern 128 which includes a plurality of candidate physical transfer paths 140 and at least an interchange node 144, wherein pairing each physical transfer path and interchange node 144 represents an optimal physical transfer.

Continuing in reference to FIG. 1, computing device 104 is configured to select a physical transfer path that minimizes the objective function. In non-limiting illustrative examples, computing device 104 may use a ranking machine-learning process 148, wherein a ranking machine-learning process 148 may be any machine-learning process and/or algorithm used for classification as described in further detail below, wherein classification may be performed as a ranking of inputs to generate outputs classified into a ranked list, provided a criterion for ranking. In non-limiting illustrative examples, the ranking may be a limitation logistic regression and/or naive Bayes ranking algorithm, nearest neighbor algorithm such as k-nearest neighbors, support vector machines, least squares support vector machines, fisher's linear discriminant, quadratic classifiers, decision trees, boosted trees, random forest classifiers, learning vector quantization, and/or neural network-based algorithms, as described herein. Ranking machine-learning process 148 may accept an input that is a plurality of candidate transfer paths 140, a plurality of physical transfer patterns 128, and/or any other determination of a system 100 as described herein, and generate an output that is a ranked list of outputs according to a ranking criteria. For instance and without limitation, a ranking criterion may be that the highest ranking is reserved for the outcome that results in minimal time for a physical transfer, or the least amount of physical transfer apparatuses 112 required. A ranking process may include any of the functions described above, such as an objective function that may input a plurality of objectives, such as a plurality of constraints, and rank the objectives by a variety of factors, for instance without limitation, by number of physical transfer apparatuses used, time required for physical transfer path, and the like, and output a first rank-ordered goal set 124 ranked by that function. Computing device 104 may perform a ranking algorithm using a machine-learning process, as described in further detail below. Computing device 104 may perform a ranking function using any process, method, and/or algorithm as described herein wherein ranking is based on physical transfer recourses and physical transfer time. In non-limiting illustrative examples, computing device 104 may include interchange node 144 for a cluster machine-learning process 128 depending on if the ranking determines that adding an interchange node 144 results in higher ranked candidate physical transfer paths 140 and/or higher ranked physical transfer patterns 128.

Continuing in reference to FIG. 1, determining which physical transfer path and/or interchange node 144 pairing represents an optimal physical transfer path may include selecting the optimal physical transfer path which minimizes physical transfer resources and physical transfer time as a function of the ranking. Computing device 104 may select the candidate physical transfer path 140 and interchange node pairing that results in the optimal physical transfer path, wherein the optimal physical transfer path minimizes physical transfer resources and physical transfer time according to the ranking. In non-limiting illustrative examples, the candidate physical transfer path 140 and interchange node pairing may include no interchange node 144. In further non-limiting illustrative examples, computing device 104 may select the optimal candidate physical transfer path 140, wherein each candidate transfer path 140 is for a single alimentary element and/or alimentary element originator. In such an instance, computing device 104 may generate the optimal physical transfer pattern 128 by selecting the optimal candidate physical transfer path 140 for each individual alimentary element. Alternatively or additionally, computing device 104 may generate the optimal physical transfer pattern 128 by selecting the optimal candidate physical transfer path 140 for each cluster combination, wherein the candidate physical transfer path 140 is a physical transfer path for all alimentary elements. Furthermore, without limitation, the optimal candidate physical transfer path 140 may include one or more interchange nodes 144 paired with the physical transfer path.

Continuing in reference to FIG. 1, computing device 104 is configured to determine a cluster instruction set for the physical transfer pattern 128 to the single destination. A "cluster instruction set," as used in this disclosure, is a series of steps and/or instructions associated with carrying out the physical transfer pattern 128, which includes the physical transfer paths for at least a physical transfer apparatus 112 to follow, the geolocation and times associated with any interchange nodes 144, the timestamps for alimentary element originators are to generate alimentary elements, and the single destination for the cluster 108. A cluster instruction set 152 may be generated for the optimal physical transfer pattern, as selected by the computing device 104.

Continuing in reference to FIG. 1, determining a cluster instruction set 152 for a selected physical transfer pattern 128 to a single locale may include generating preparation instructions as a function of the selected physical transfer pattern and may include transmitting the preparation instructions to at least an alimentary element originator. Preparation instructions may include instructions directed to alimentary element originators based on when to prepare and/or generate each alimentary element and to which physical transfer apparatus 112 each alimentary element belongs. Computing device 104 may determine which instructions contain information that corresponds to responsibilities delegated to alimentary element originators, including when to prepare and/or generate alimentary elements, the identity of the physical transfer apparatus destined to receive the alimentary element and when the physical transfer to the physical transfer apparatus is to occur. Computing device 104 may generate a representation of the cluster instruction set 152 as it pertains to the alimentary element originator, as described in further detail below. Computing device 104 may transmit the preparation instructions to at least an alimentary element origination via a graphical user interface, as described in further detail below.

Continuing in reference to FIG. 1, determining a cluster instruction set 152 for a selected physical transfer pattern 128 to a single locale may include generating physical transfer instructions as a function of the selection physical transfer pattern and may include transmitting the physical transfer instructions to at least a physical transfer apparatus. Physical transfer instructions may include instructions directed to at least a physical transfer apparatus 112 based on where to receive each alimentary element and the geophysical path associated with the optimal physical transfer pattern 128 and the location and time for any interchange nodes 144. Computing device 104 may determine which instructions contain information that corresponds to responsibilities delegated physical transfer apparatuses 112, including where to receive the alimentary elements from originators, the identity of the alimentary element, the physical transfer path to the alimentary element, the location and times associated with any interchange nodes 144, the physical transfer path to any interchange nodes 144, the physical transfer path to the single locale, and/or the identity to any of the plurality of users to which the cluster combination of alimentary elements belongs. Computing device 104 may generate a representation of the cluster instruction set 152 as it pertains to the physical transfer apparatuses, as described in further detail below. Cluster instruction set 152 may include instructions regarding where to receive each alimentary element and the geophysical path associated with the optimal physical transfer pattern 128 and the location and time for any interchange nodes 144. Computing device 104 may transmit the physical transfer instructions to at least a physical transfer apparatus via a graphical user interface, as described in further detail below.

Continuing in reference to FIG. 1, computing device 104 is configured to generate a representation of the cluster instruction set 152 via a graphical user interface to at least a physical transfer apparatus 112 and the plurality of alimentary element originators. Computing device 104 may generate a representation of the cluster instruction set 152 via a graphical user interface that includes graphics, text, and/or any other audiovisual display and/or transmittance. A "graphical user interface," as used in this disclosure, is any form of a user interface that allows a user to interface with an electronic device through graphical icons, audio indicators, text-based interface, typed command labels, text navigation, and the like, wherein the interface is configured to provide information to the user and accept input from the user. Computing device 104 may generate a representation of the cluster instruction set 152 via a graphical user interface using any mapping application or algorithm, for instance and without limitation, a web-based navigation application such, a mobile navigation application, or the like. Persons skilled in the art, upon review of this disclosure in its entirety, will be aware of the various ways in which a computing device 104 may display to a user a physical transfer path via a graphical user interface, and be aware the various navigation applications that may be used to communicate a physical transfer path.

Figures 2A, 2B:
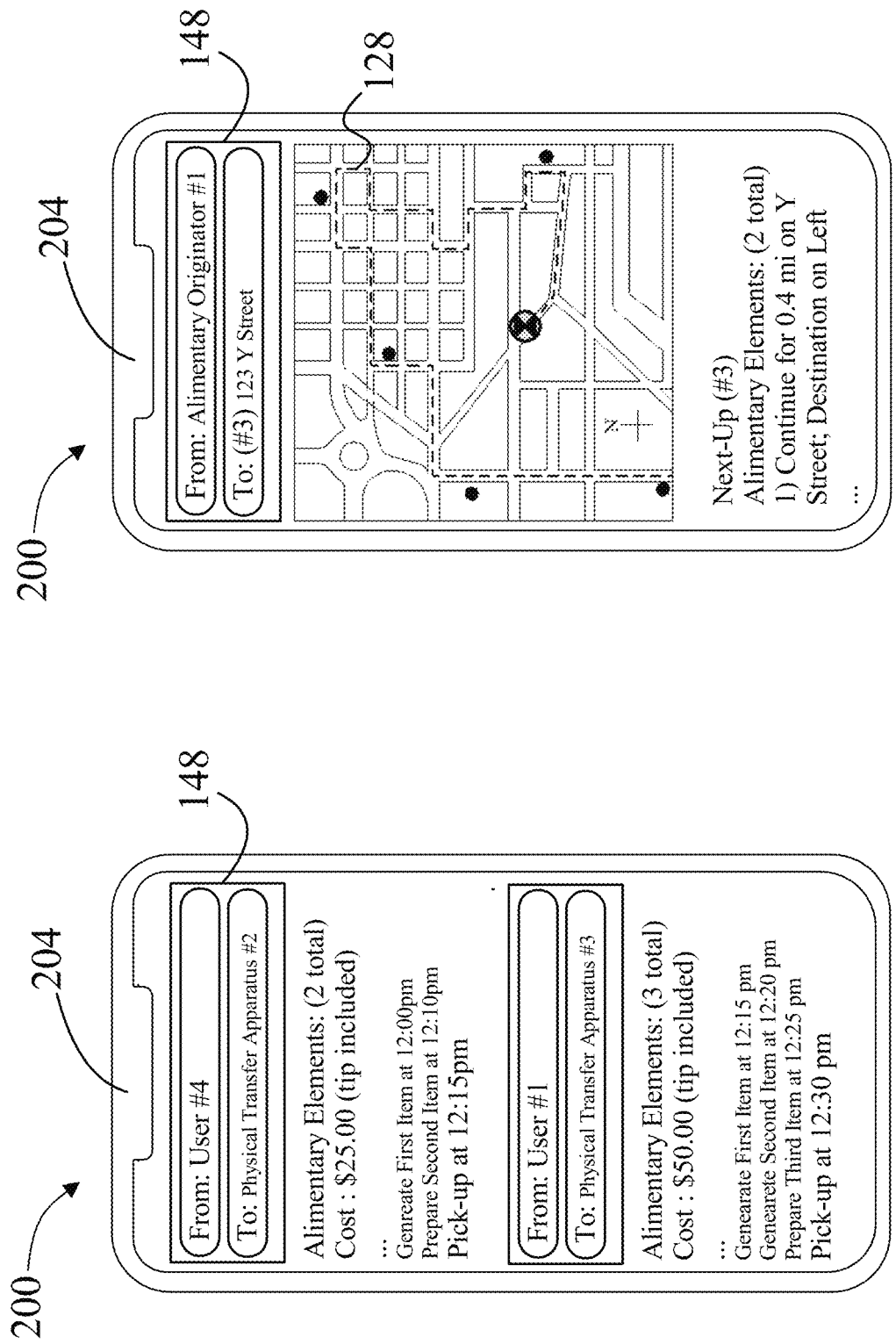
FIGS. 2A-2B are diagrammatic representations of exemplary embodiments of a user device for providing a cluster instruction set.

Referring now to FIGS. 2A and 2B, a non-limiting exemplary embodiment 200 of a user device 204 for providing a cluster instruction set 152 is illustrated. Computing device 104 may generate, for instance and without limitation, at least two different representation of a cluster instruction set 152, wherein one representation is configured for an alimentary element originator (as depicted in FIG. 2A) and one representation is configured for a physical transfer apparatus (as depicted in FIG. 2B). Computing device 104 may display cluster instruction set 152 instruction via a user device 204, wherein a user device is any device that may be a computing device 104, such as a "smartphone", laptop, tablet, or any other device with capabilities as described herein. In non-limiting exemplary embodiments, user device 204 may display the generated representation via a graphical user interface (GUI), wherein the GUI represents, as is the case in FIG. 2A, which alimentary element relates to which user, when to generate and/or prepare each alimentary element, the identity of the physical transfer apparatus to obtain the items, the payment status of the alimentary element, and the rank with which to prepare items according to the timing of the physical transfer paths associated with a plurality of cluster combinations 108. In non-limiting exemplary embodiments, user device 204 may display the generated representation via a graphical user interface (GUI), wherein the GUI represents, as is the case in FIG. 2B, the identity and location of the alimentary element originator, the order in which the alimentary elements of the cluster 108 are to be received, and the physical transfer pattern 128 associated with the physical transfer apparatus 112.

Figure 3:
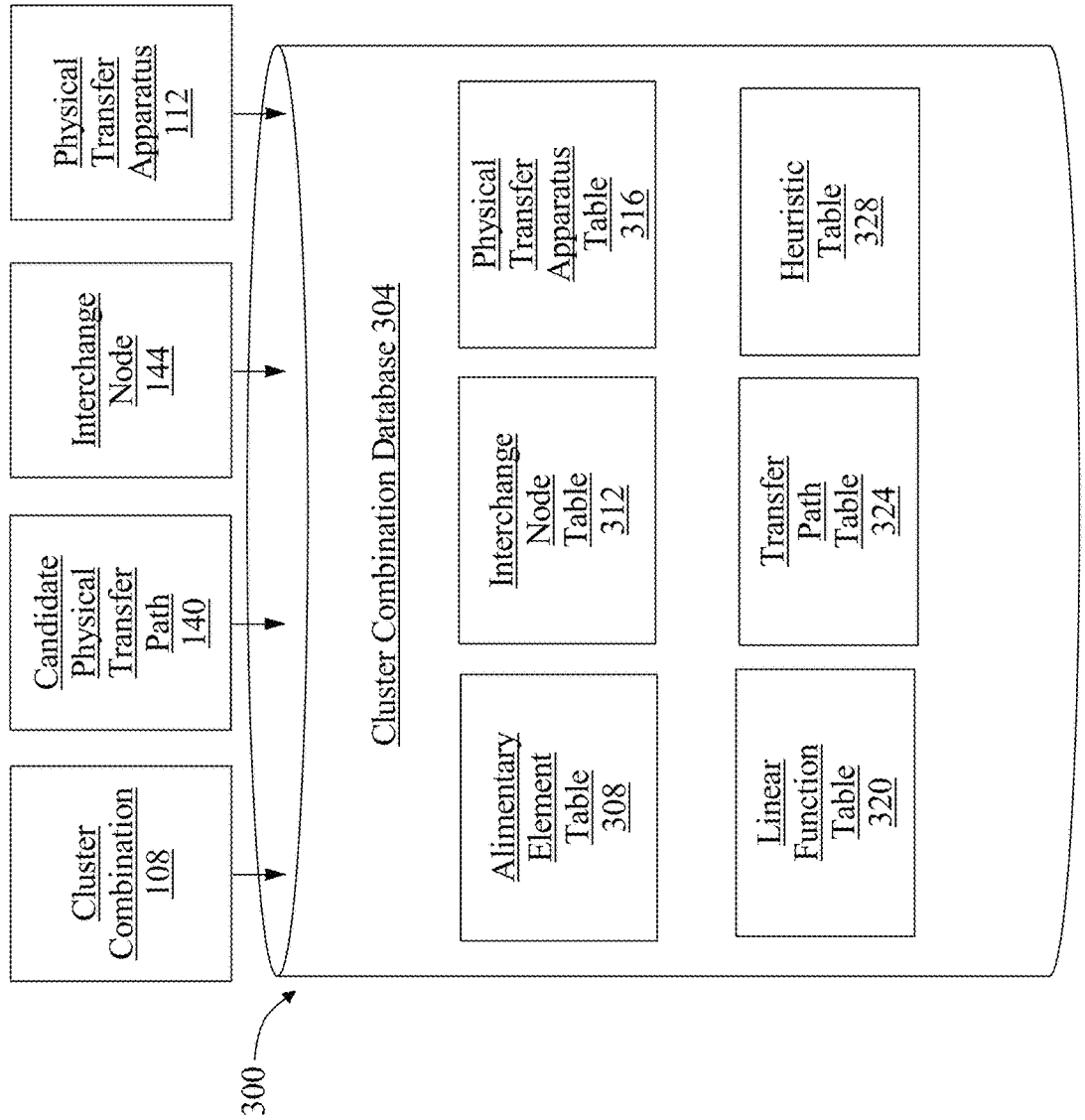
FIG. 3 is a block diagram of an exemplary embodiment of a cluster database.

Referring now to FIG. 3, a non-limiting exemplary embodiment 300 of a cluster combination database 304 is illustrated. Cluster combination database 304 may be implemented, without limitation, as a relational database, a key-value retrieval database such as a NOSQL database, or any other format or structure for use as a database that a person skilled in the art would recognize as suitable upon review of the entirety of this disclosure. Cluster combination database 304 may alternatively or additionally be implemented using a distributed data storage protocol and/or data structure, such as a distributed hash table and the like. Cluster combination database 304 may include a plurality of data entries and/or records, as described above. Data entries in a cluster combination database 304 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Further referring to FIG. 3, cluster combination database 304 may include, without limitation, an alimentary element table 308, interchange node table 312, physical apparatus table 316, objective function table 320, transfer path table 324, and/or heuristic table 328. Determinations by a machine-learning process, machine-learning model, ranking function, mapping algorithm, and/or objective function may also be stored and/or retrieved from the cluster combination database 304, for instance in non-limiting examples a classifier describing a plurality of candidate transfer paths 140 as it relates to a selected interchange node 144, wherein a classifier is an identifier that denotes a subset of data that contains a heuristic and/or relationship, as may be useful to system 100 described herein. Determinations by a machine-learning process for selecting a region for determining a physical transfer pattern 128 and/or a rankings of candidate physical transfer paths 140 based on physical transfer apparatus availability, geolocation, timing, and the like, may also be stored and/or retrieved from the cluster combination database 304. As a non-limiting example, cluster combination database 304 may organize data according to one or more instruction tables. One or more cluster combination database 304 tables may be linked to one another by, for instance in a non-limiting example, common column values. For instance, a common column between two tables of cluster combination database 304 may include an identifier of a submission, such as a form entry, textual submission, global position system (GPS) coordinates, addresses, and the like, for instance as defined herein; as a result, a query by a computing device 104 may be able to retrieve all rows from any table pertaining to a given submission or set thereof. Other columns may include any other category usable for organization or subdivision of data, including types of data, names and/or identifiers of individuals submitting the data, times of submission, and the like; persons skilled in the art, upon reviewing the entirety of this disclosure, will be aware of various ways in which data from one or more tables may be linked and/or related to data in one or more other tables.

Still referring to FIG. 3, in a non-limiting embodiment, one or more tables of a cluster combination database 304 may include, as a non-limiting example, an alimentary element table 308, which may include geolocations, GPS coordinates, addresses, or the like, associated with the location of a plurality of users corresponding to a cluster 108, the identity of the alimentary elements in said cluster 108, and/or linked to other data such as the order destination geolocation data for the cluster combination, the alimentary element identifiers 136, and/or other elements of data computing device 104 and/or system 100 may store, retrieve, and use to determine usefulness and/or relevance of data in determining physical transfer patterns 128, assigning physical transfer apparatuses 112, and the like, as described in this disclosure. One or more tables may include interchange node table 312, which may include a history of numerical values, GPS coordinates, addresses, timestamps, and the like, for instance and without limitation, that represent interchange nodes 144 determined for physical transfer apparatuses in determining location and time for interchange nodes 144 that may have worked in the past. One or more tables may include a physical transfer apparatus table 316, which may store and/or organize the number and identity of physical transfer apparatuses 112, their availability, geolocation, and the like. One or more tables may include an objective function table 320, which may store and/or organize which may store and/or organize rankings, scores, models, outcomes, functions, numerical values, vectors, matrices, and the like, that represent determinations, optimizations, iterations, variables, and the like used in optimizing an objective function, as described herein, including data corresponding to a plurality of constraints associated with optimizing the objective function for determining a physical transfer pattern 128. One of more tables may include a transfer path table 324, which may include geolocations, GPS coordinates, addresses, or the like, associated with one or more candidate physical transfer paths 140, the success rate of using a physical transfer path, and other confounding variables associated with following a physical transfer path including traffic patterns, roadwork, obstacles, and the like. One or more tables may include, without limitation, a heuristic table 328, which may include one or more inputs describing potential mathematical relationships between at least an element of user data and, for instance and without limitation, batching instructions, and rankings thereof, and/or predicted paths and how they may change as a function of reaching particle areas of a map, as described in further detail below.

Figure 4:
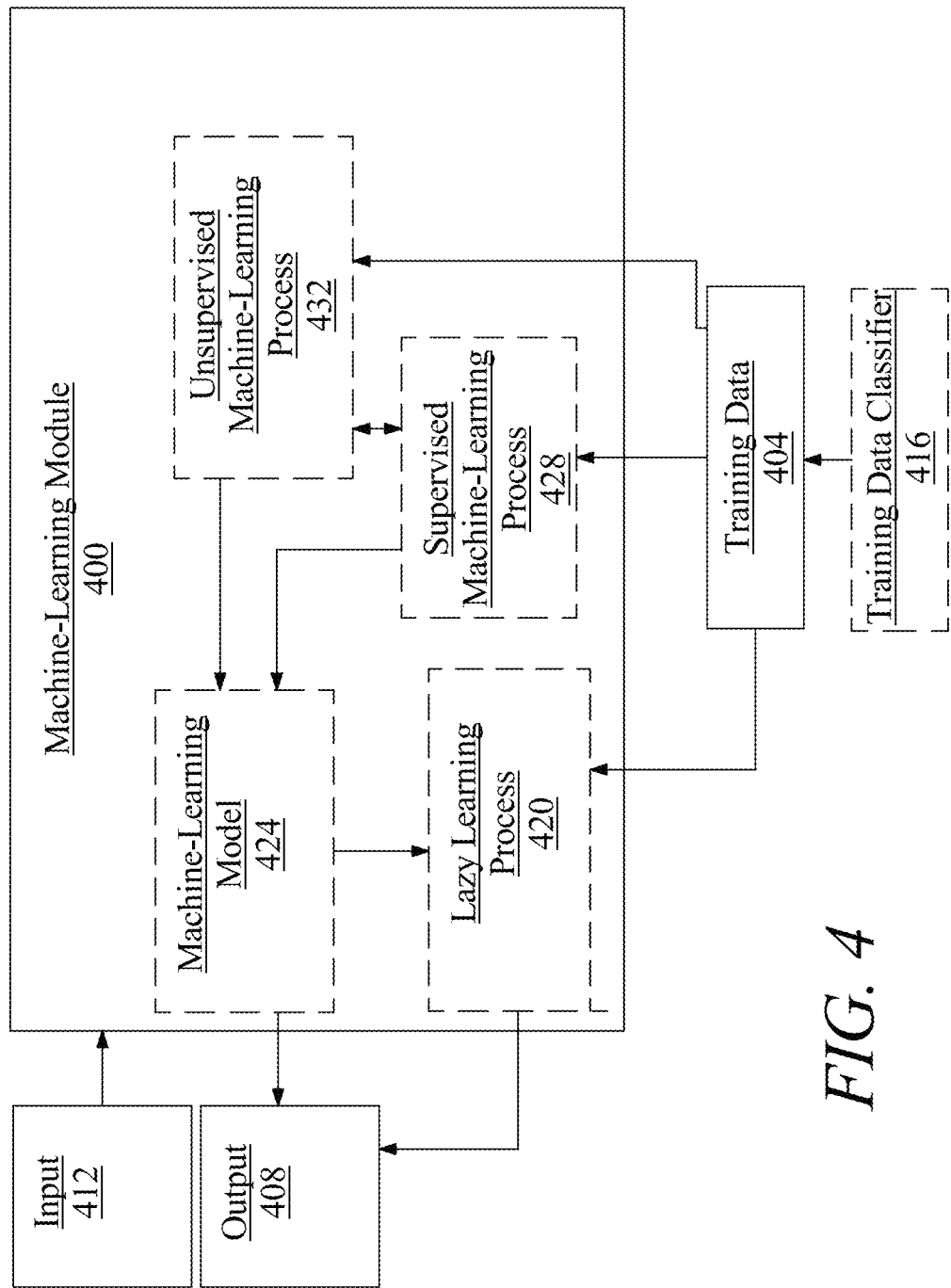
FIG. 4 is a block diagram of an exemplary embodiment of a machine-learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a process whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to elements that characterizes a sub-population, such as a subset of physical transfer paths and/or other analyzed items and/or phenomena for which a subset of training data may be selected.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include a plurality of constraints 132 and a cluster 108 as described above as inputs, candidate physical transfer paths 140 as outputs, and a ranking function representing a desired form of relationship to be detected between inputs and outputs; ranking function may, for instance, seek to maximize the probability that a given input and/or combination of elements inputs is associated with a given output to minimize the probability that a given input is not associated with a given output. Ranking function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples.

Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Still referring to FIG. 4, models may be generated using alternative or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using training data 404.

Figure 5:
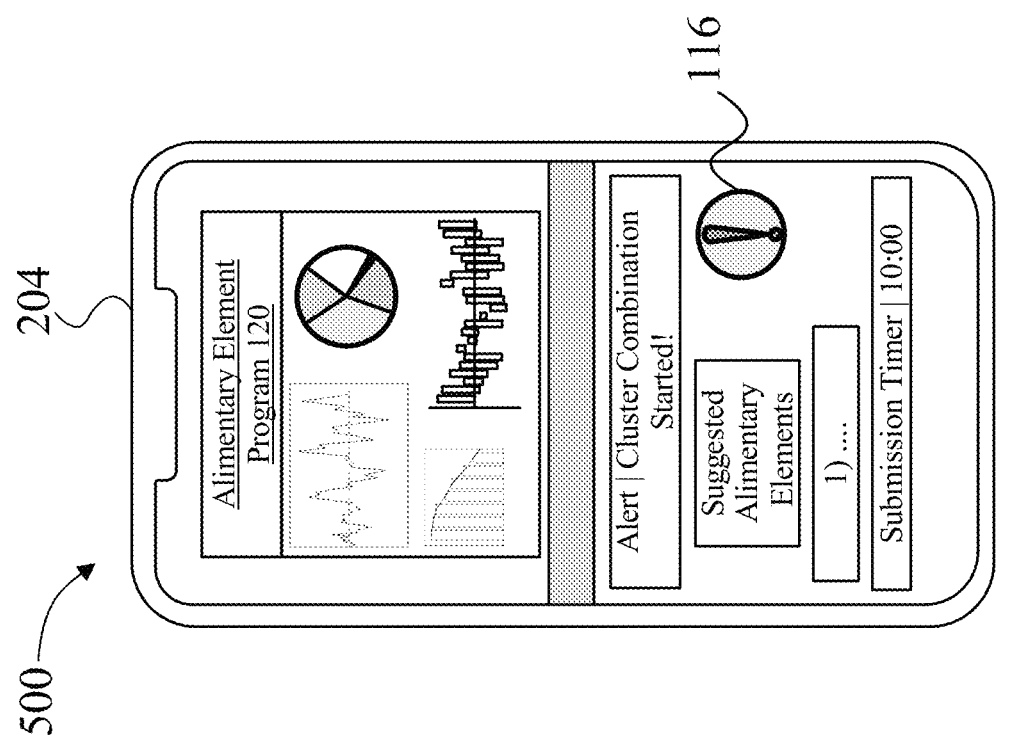
FIG. 5 is a diagrammatic representation of an exemplary embodiment of a user device providing an audiovisual notification.

Referring now to FIG. 5, a non-limiting exemplary embodiment 500 of a user device is illustrated. An audiovisual notification 116 may be transmitted via a graphical user interface, as described herein, to each user of the plurality of users, for instance and without limitation, within a particular radius of the single locale about submitting suitable alimentary elements to the cluster combination. Submitting "suitable" alimentary elements may refer to alimentary elements that correspond with the users' respective alimentary element programs 120, as described above. A "particular radius," as used in this disclosure, is a predetermined distance that system 100 may use to allow users to submit to a cluster 108. In non-limiting illustrative embodiments, a particular radius may be all users provided a login token for accessing a cluster 108, wherein the cluster 108 is started by a 'host' and the host may open the cluster 108 queue for alimentary element submission based on some criteria. In further non-limiting illustrative embodiments, host may send a login token to access the cluster 108 for ordering via the graphical user interface. A particular radius may refer to all users in an office, for instance on a particular floor of an office building. A particular radius may be all users connected to a particular network, such as an internet network, internet-of-things (IOT) network, or the like, such as the tenants of a shared apartment or members of a single-family household. A particular radius may refer to all users of an apartment building, wherein users may submit orders within a specified window of time for alimentary elements to be added to a cluster 108.

Still referring to FIG. 5, audiovisual notification 116 may be provided to a user within a particular radius wherein the notification alerts a user to a cluster combination queue. The audiovisual notification 116 may include information about submitting to the cluster 108, for instance with the cluster 108 will be submitted, which may be indicated by a countdown, timer, or the like.

Figure 6:
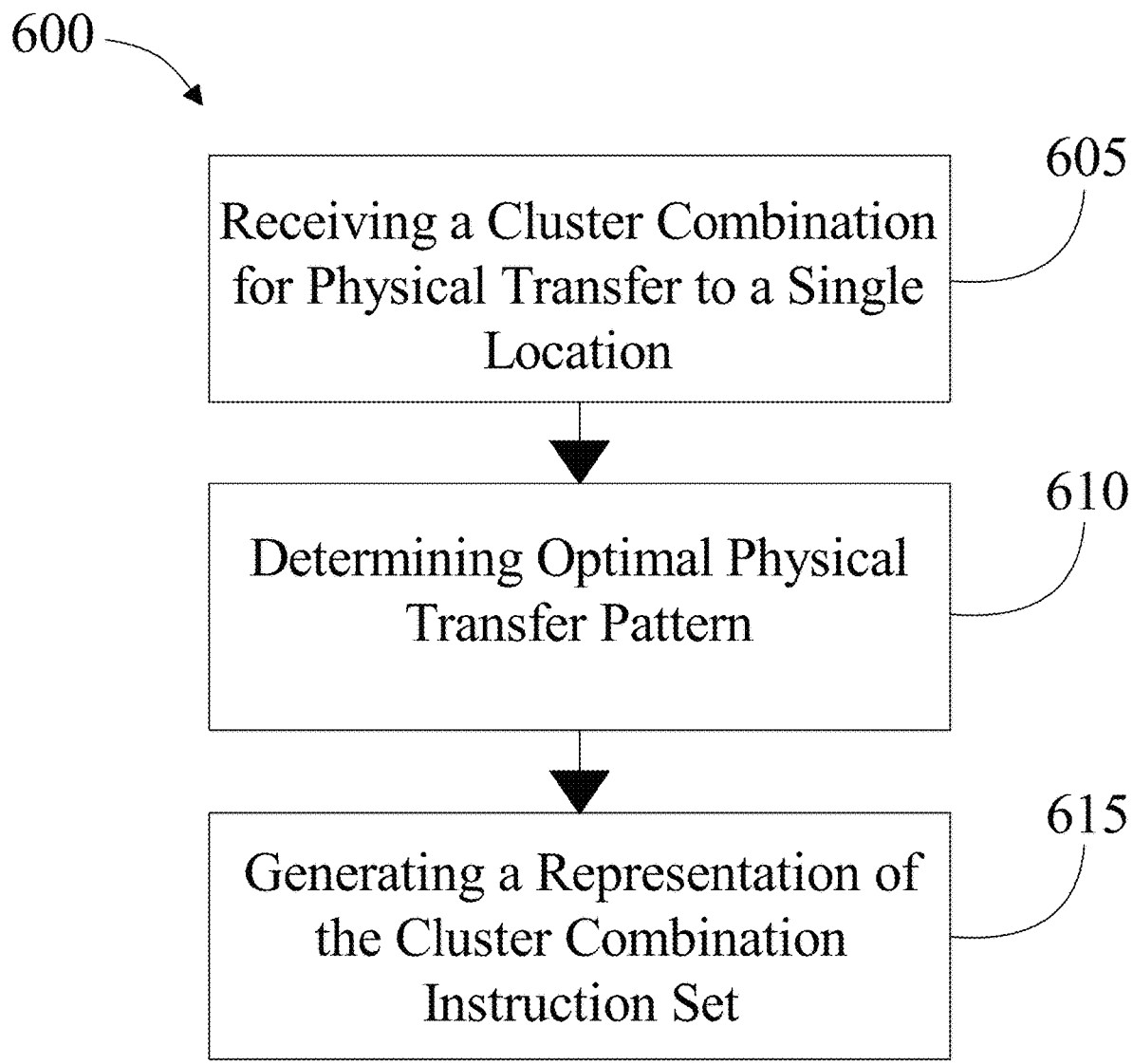
FIG. 6 is a block diagram of an exemplary embodiment of a method for generating a cluster instruction set.

Referring now to FIG. 6, an exemplary embodiment of a method 600 for generating a cluster instruction set is illustrated. At step 605, computing device 104 is configured for generating, as a function of a received cluster, a plurality of physical transfer paths from a distinct plurality of initiation points to a single locale, wherein the cluster comprises a cluster of a plurality of alimentary elements for physical transfer to the single locale. Receiving the cluster 108 may include generating an audiovisual notification 116 in response to receiving the cluster 108. The audiovisual notification 116 may address a user to submit an alimentary element to the cluster 180, wherein the alimentary element corresponds to an alimentary element program 120; this may be implemented, without limitation, as described above in reference to FIGS. 1-5.

Still referring to FIG. 6, at step 610, computing device 104 is configured for determining, as a function of the plurality of physical transfer paths, a physical transfer pattern 128, wherein determining the physical transfer pattern 128 includes generating an objective function of the plurality of physical transfer paths 140 as a function of a plurality of constraints 132, wherein minimizing the objective function minimizes the plurality of physical transfer resources, selecting a physical transfer path that minimizes objective function, and determining a cluster combination instruction set 152 for the physical transfer pattern 128 to the single destination. Determining the physical transfer pattern 128 may include generating a plurality of physical transfer paths 140 using a cluster machine-learning process 124, wherein the cluster machine-learning process 124 generates at least a physical transfer path for each alimentary element of the cluster 108. The plurality of constraints 132 may include geophysical data regarding each apparatus of the plurality of physical transfer apparatuses 112. Using the cluster machine-learning process 124 to determine the physical transfer pattern 128 may include generating an identifier 136 for each alimentary element of the cluster 108 of the plurality of alimentary elements, and determining, using the identifier 136 and the objective function, when each alimentary element originator should generate each alimentary element as a function of the plurality of constraints 132 and the plurality of physical transfer paths 140. Minimizing the plurality of physical transfer resources may include minimizing the number of physical transfer apparatuses utilized while minimizing the amount of time to perform the physical transfer pattern. Determining a physical transfer pattern may include using the cluster machine-learning process to identify at least an interchange node 144, wherein each interchange node 144 of the at least an interchange node 144 comprises a node location and a node time based on the physical locations of a plurality of physical transfer apparatuses 112 prior to physical transfer to a user location, calculating a change in candidate physical transfer path time and distance resulting from using the interchange node 144, and determining which physical transfer path and interchange node 144 pairing of the plurality of candidate transfer paths 140 minimizes the objective function; this may be implemented, without limitation, as described above in reference to FIGS. 1-5.

Continuing in reference to FIG. 6, determining a physical transfer pattern may include using a cluster machine-learning process 124 to generate a plurality of candidate transfer paths 140, wherein each candidate physical transfer path 140 is a geophysical path that a physical transfer apparatus 112 may follow to obtain an alimentary element and transfer to a single locale, generating at least an interchange node 144, wherein each interchange node 144 comprises a node location and a node time based on the physical locations of a plurality of physical transfer apparatuses 112 prior to physical transfer to a user location, calculating a change in candidate physical transfer path 140 time and distance resulting from using the interchange node 144, and determining which physical transfer path and interchange node 144 pairing of the plurality of candidate transfer paths represents an optimal physical transfer. Determining which transfer path and interchange node 144 pairing represents an optimal physical transfer path may include ranking, using a ranking machine-learning process, a plurality of transfer paths and a plurality of interchange nodes 144, wherein ranking is based on physical transfer resources and physical transfer time, and selecting the optimal physical transfer path which minimizes physical transfer resources and physical transfer time as a function of the ranking; this may be implemented, without limitation, as described above in reference to FIGS. 1-5.

Continuing in reference to FIG. 6, at step 615, computing device 104 is configured for generating a representation of the cluster instruction set 152 via a graphical user interface to at least a physical transfer apparatus 112 and the plurality of alimentary element originators. Determining a cluster instruction set 152 for a selected physical transfer pattern 128 to a single destination may include generating preparation instructions as a function of the selected physical transfer pattern 128 and transmitting the preparation instructions to at least an alimentary element originator. Determining a cluster instruction set 152 for a selected physical transfer pattern 128 to a single destination may include generating physical transfer instructions as a function of the selected physical transfer pattern 128 and transmitting the physical transfer instructions to at least a physical transfer apparatus 112; this may be implemented, without limitation, as described above in reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
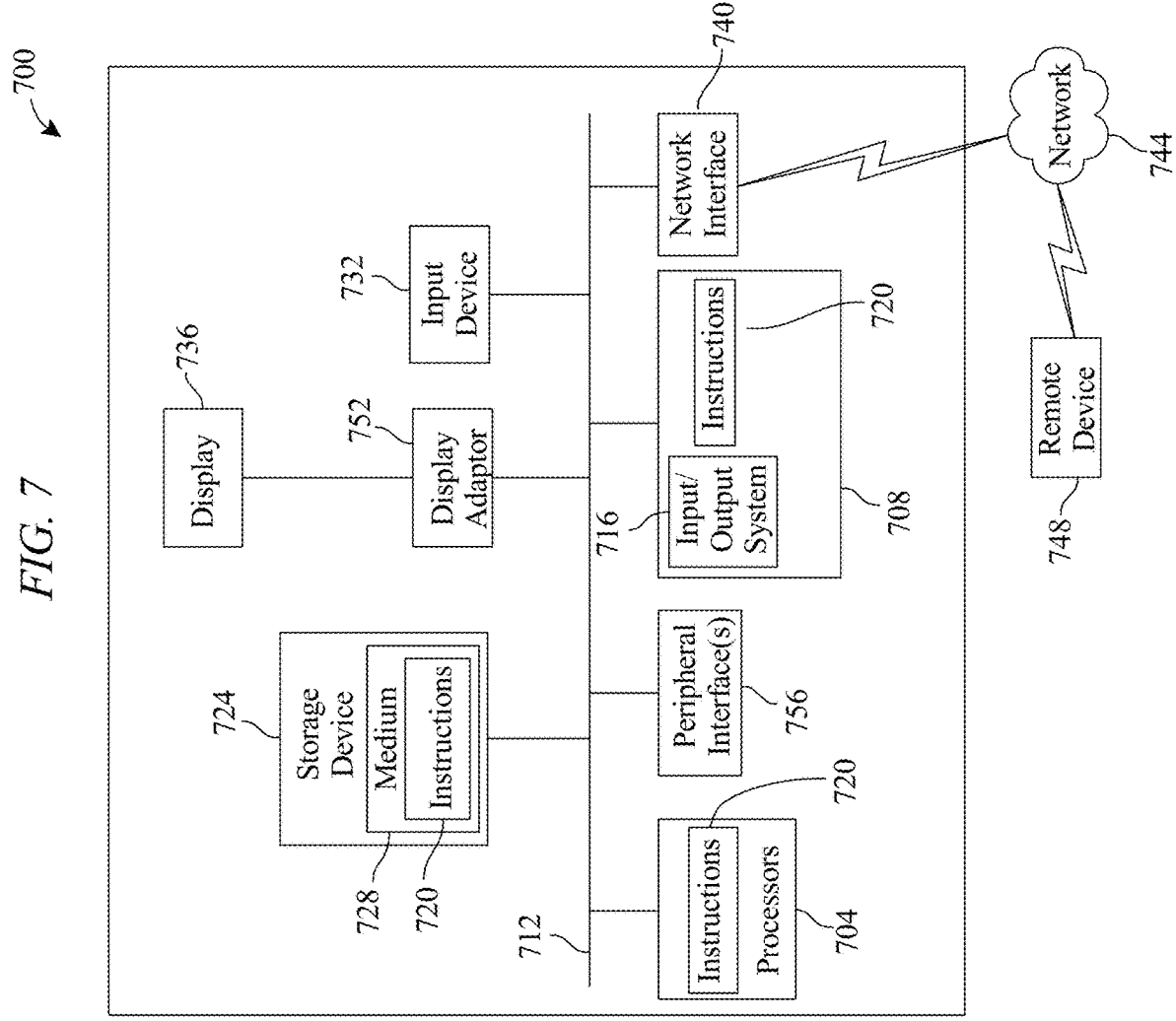
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for generating a cluster combination instruction set using machine learning, the system comprising a computing device, wherein the computing device is configured to:
produce an alimentary element program, wherein producing the alimentary element program further comprises:
receiving at least one biological extraction datum from a user;
generating the alimentary element program as a function of the at least one biological extraction datum; and
displaying the alimentary element program;
generate, as a function of a received cluster, a plurality of physical transfer paths from a series of distinct initiation points to a single locale, wherein the cluster comprises a cluster of a plurality of alimentary elements originating from a plurality of establishments for physical transfer to the single locale at the same time;
determine, as a function of the plurality of physical transfer paths, a physical transfer pattern, wherein determining the physical transfer pattern comprises:
generating an objective function of the plurality of physical transfer paths as a function of a plurality of constraints, wherein minimizing the objective function minimizes a plurality of physical transfer resources;
selecting a physical transfer path that minimizes the objective function by using a machine-learning process, wherein the machine-learning process is configured to receive a plurality of transfer paths as inputs and assign each of the plurality of transfer paths a score as a function of a predetermined variable and outputs a ranked lists of outputs as a function of a ranking criteria, wherein the ranking criteria includes the least amount of physical transfer apparatuses required; and
determining a cluster combination instruction set for the physical transfer pattern to the single locale; and
generate a representation of the cluster combination instruction set via a graphical user interface to at least a physical transfer apparatus and the plurality of establishments.

2. The system of claim 1, wherein receiving the cluster further comprises generating an audiovisual notification in response to receiving the cluster.

3. The system of claim 2, wherein the audiovisual notification addresses the user to submit an alimentary element to the cluster, wherein the alimentary element corresponds to an alimentary element program.

4. The system of claim 1, wherein determining the physical transfer pattern further comprises generating a plurality of physical transfer paths using a cluster machine-learning process, wherein the cluster machine-learning process generates at least a physical transfer path for each alimentary element of the cluster.

5. The system of claim 1, wherein the plurality of constraints further comprises geophysical data regarding each physical transfer apparatus.

6. The system of claim 1, wherein using the cluster machine-learning process to determine the physical transfer pattern further comprises:
generating an identifier for each alimentary element of the cluster of the plurality of alimentary elements; and
determining, using the identifier and the objective function, when each alimentary element originator should generate each alimentary element as a function of the plurality of constraints and the plurality of physical transfer paths.

7. The system of claim 1, wherein minimizing the plurality of physical transfer resources further comprises minimizing the number of physical transfer apparatuses utilized while minimizing the amount of time to perform the physical transfer pattern.

8. The system of claim 1, wherein determining a physical transfer pattern further comprises:
using the cluster machine-learning process to identify at least an interchange node, wherein each interchange node of the at least an interchange node comprises a node location and a node time based on the physical locations of a plurality of physical transfer apparatuses prior to physical transfer to the user location;
calculating a change in candidate physical transfer path time and distance resulting from using the interchange node; and
determining which physical transfer path and interchange node pairing of the plurality of candidate transfer paths minimizes the objective function.

9. The system of claim 1, wherein determining a cluster instruction set for the selected physical transfer pattern to a single locale further comprises:
generating preparation instructions as a function of the selected physical transfer pattern; and
transmitting the preparation instructions to at least an alimentary element originator.

10. The system of claim 1, wherein determining a cluster instruction set for the selected physical transfer pattern to a single locale further comprises:
generating physical transfer instructions as a function of the selected physical transfer pattern; and
transmitting the physical transfer instructions to at least a physical transfer apparatus.

11. A method for generating a cluster combination instruction set using machine learning, the method comprising a computing device, wherein the computing device is configured for:
producing an alimentary element program, wherein producing the alimentary element program further comprises:
receiving at least one biological extraction datum from a user;
generating the alimentary element program as a function of the at least one biological extraction datum; and
displaying the alimentary element program;
generating, as a function of a received cluster, a plurality of physical transfer paths from a series of distinct initiation points to a single locale, wherein the cluster comprises a cluster of a plurality of alimentary elements originating from a plurality of establishments for physical transfer to the single locale at the same time;

determining, as a function of the plurality of physical transfer paths, a physical transfer pattern, wherein determining the physical transfer pattern comprises:
  generating an objective function of the plurality of physical transfer paths as a function of a plurality of constraints, wherein minimizing the objective function minimizes a plurality of physical transfer resources;
  selecting a physical transfer path that minimizes objective by using a machine-learning process, wherein the machine-learning process is configured to receive a plurality of transfer paths as inputs and outputs a ranked lists of outputs as a function of a ranking criteria, wherein the ranking criteria includes the least amount of physical transfer apparatuses required; and
  determining a cluster combination instruction set for the physical transfer pattern to the single destination; and
generating a representation of the cluster combination instruction set via a graphical user interface to at least a physical transfer apparatus and the plurality of establishments.

12. The method of claim 11, wherein receiving the cluster further comprises generating an audiovisual notification in response to receiving the cluster.

13. The method of claim 12, wherein the audiovisual notification addresses a user to submit an alimentary element to the cluster, wherein the alimentary element corresponds to an alimentary element program.

14. The method of claim 11, wherein determining the physical transfer pattern further comprises generating a plurality of physical transfer paths using a cluster machine-learning process, wherein the cluster machine-learning process generates at least a physical transfer path for each alimentary element of the cluster.

15. The method of claim 11, wherein the plurality of constraints further comprises geophysical data regarding each apparatus of the plurality of physical transfer apparatuses.

16. The method of claim 11, wherein using the cluster machine-learning process to determine the physical transfer pattern further comprises:
  generating an identifier for each alimentary element of the cluster of the plurality of alimentary elements; and
  determining, using the identifier and the objective function, when each alimentary element originator should generate each alimentary element as a function of the plurality of constraints and the plurality of physical transfer paths.

17. The method of claim 11, wherein minimizing the plurality of physical transfer resources further comprises minimizing the number of physical transfer apparatuses utilized while minimizing the amount of time to perform the physical transfer pattern.

18. The method of claim 11, wherein determining a physical transfer pattern further comprises:
  using the cluster machine-learning process to identify at least an interchange node, wherein each interchange node of the at least an interchange node comprises a node location and a node time based on the physical locations of a plurality of physical transfer apparatuses prior to physical transfer to a user location;
  calculating a change in candidate physical transfer path time and distance resulting from using the interchange node; and
  determining which physical transfer path and interchange node pairing of the plurality of candidate transfer paths minimizes the objective function.

19. The method of claim 11, wherein determining a cluster instruction set for the selected physical transfer pattern to a single locale further comprises:
  generating preparation instructions as a function of the selected physical transfer pattern; and
  transmitting the preparation instructions to at least an alimentary element originator.

20. The method of claim 11, wherein determining a cluster instruction set for the selected physical transfer pattern to a single locale further comprises:
  generating physical transfer instructions as a function of the selected physical transfer pattern; and
  transmitting the physical transfer instructions to at least a physical transfer apparatus.

\* \* \* \* \*